US009357519B2

(12) United States Patent
Diener et al.

(10) Patent No.: US 9,357,519 B2
(45) Date of Patent: May 31, 2016

(54) PROBE RESPONSE SUPPRESSION USING ANGLE-OF-ARRIVAL IN A HIGH DENSITY ENVIRONMENT

(71) Applicant: Cisco Technology, Inc., San Jose, CA (US)

(72) Inventors: Neil R. Diener, Hudson, OH (US); John Matthew Swartz, Lithia, FL (US); Paul J. Stager, Akron, OH (US); Tak Ming Pang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 14/202,654

(22) Filed: Mar. 10, 2014

(65) Prior Publication Data

US 2015/0257117 A1   Sep. 10, 2015

(51) Int. Cl.
*H04W 48/02* (2009.01)
*H04W 64/00* (2009.01)
*H04W 48/14* (2009.01)
*H04W 48/06* (2009.01)

(52) U.S. Cl.
CPC .............. *H04W 64/00* (2013.01); *H04W 48/14* (2013.01); *H04W 48/06* (2013.01)

(58) Field of Classification Search
CPC ..... H04W 64/00; H04W 48/16; H04W 48/20; H04W 4/023; H04W 4/025; H04L 12/2697; H04B 7/0617
USPC .................................................. 370/252, 328
See application file for complete search history.

(56) References Cited

U.S. PATENT DOCUMENTS

| 7,274,677 | B1 * | 9/2007 | Lewis ................... H04B 7/0617 370/310.2 |
| 8,639,270 | B2 * | 1/2014 | Moshfeghi ............ H04W 4/025 370/330 |
| 2005/0245237 | A1 | 11/2005 | Adachi et al. |
| 2008/0004076 | A1 | 1/2008 | Adachi et al. |
| 2008/0080388 | A1 * | 4/2008 | Dean ................... H04L 12/2697 370/252 |
| 2009/0005061 | A1 * | 1/2009 | Ward ...................... G01S 5/021 455/456.1 |
| 2011/0307609 | A1 | 12/2011 | Rangarajan et al. |
| 2015/0098392 | A1 * | 4/2015 | Homchaudhuri ..... H04W 48/20 370/329 |
| 2015/0133172 | A1 * | 5/2015 | Silverman ............. H04W 4/023 455/456.6 |

* cited by examiner

*Primary Examiner* — Afsar M Qureshi
(74) *Attorney, Agent, or Firm* — Edell, Shapiro & Finnan, LLC

(57) ABSTRACT

A first wireless device (e.g., an access point) receives a message from a second wireless device (e.g., a client device). The first device determines an angle-of-arrival of the message at a plurality of antennas of the first wireless device. The first device compares the angle-of-arrival with an angle-of-arrival threshold to determine whether to transmit a response message to the second wireless device. In one example, the first wireless device is a wireless access point device operating in a wireless network, the second wireless device is a wireless client device operating in the wireless network, the message is a probe request message and the response message is a probe response message.

21 Claims, 7 Drawing Sheets

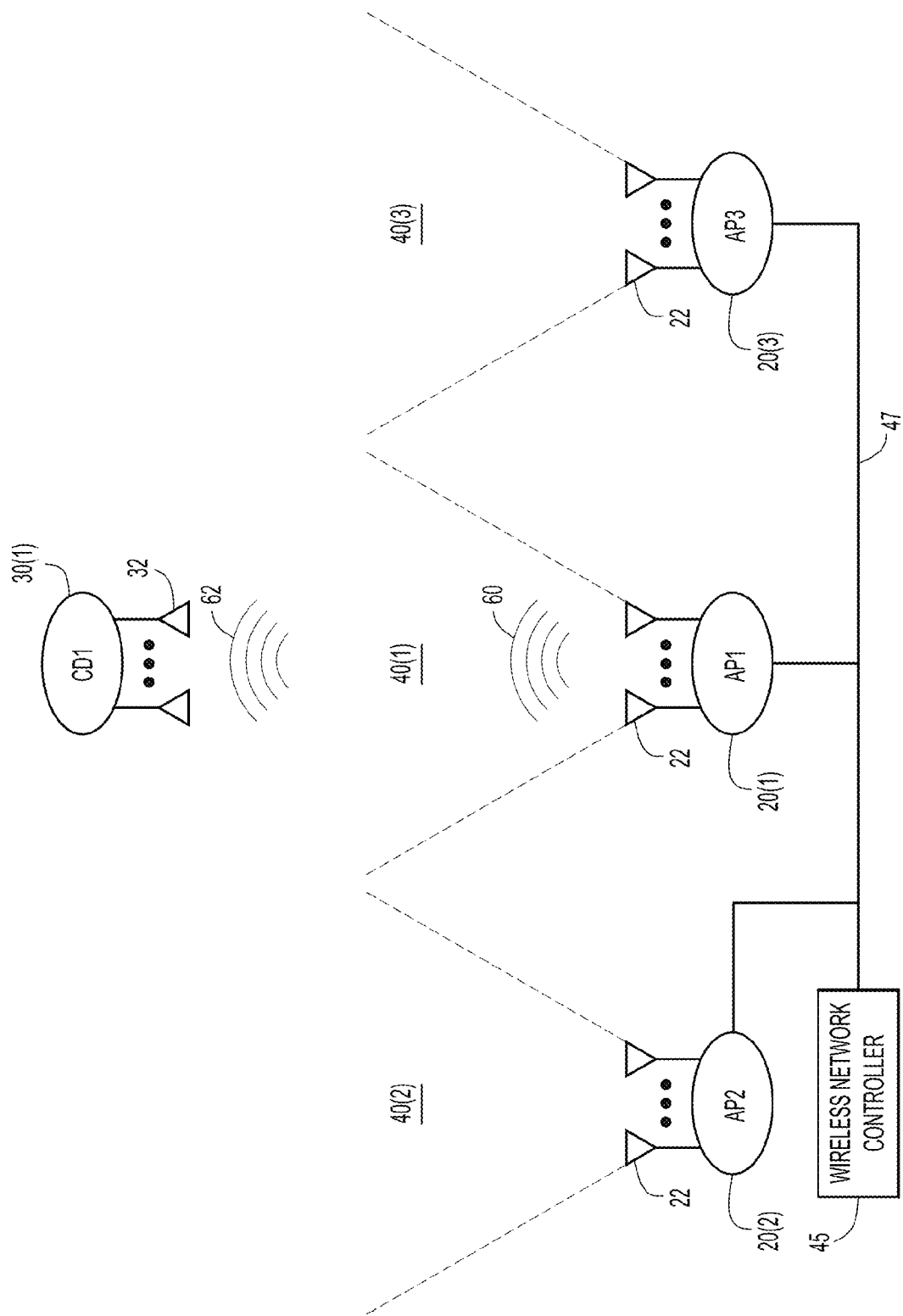

PROBE RESPONSE SUPPRESSION USING ANGLE-OF-ARRIVAL IN A HIGH DENSITY ENVIRONMENT

TECHNICAL FIELD

The present disclosure relates to wireless communication networks.

BACKGROUND

Angle-of-Arrival (AoA) has become an important technology in location determination schemes, particularly in Wi-Fi™ wireless local area networks, due to the accuracy/resolution of AoA techniques. In High Density (HD) wireless network environments, it is common that many access points (APs) receive probe request messages from a given client device, and consequently several APs send probe responses. This is true even when highly directional antennas and receive start-of-packet processing on the APs have been tuned as well as possible.

BRIEF DESCRIPTION OF THE DRAWINGS

FIGS. 1A and 1B are block diagrams showing multiple wireless access point devices configured to perform the angle-of-arrival threshold-based probe response techniques presented herein.

DESCRIPTION OF EXAMPLE EMBODIMENTS

Overview

Techniques are presented herein to control when a wireless device, e.g., a wireless access point device, transmits a response message. A first wireless device (e.g., an access point) receives a message from a second wireless device (e.g., a client device). The first device determines an angle-of-arrival of the message at a plurality of antennas of the first wireless device. The first device compares the angle-of-arrival with an angle-of-arrival threshold to determine whether to transmit a response message to the second wireless device. In one example, the first wireless device is a wireless access point device operating in a wireless network, the second wireless device is a wireless client device operating in the wireless network, the message is a probe request message and the response message is a probe response message.

Example Embodiments

In a high density (HD) wireless network environment, a typical deployment uses high-gain directional antennas at the wireless access point devices (APs) to provide sectorization of the physical space. One example of such a deployment is in an indoor arena, such as an indoor sports or entertainment arena. Due to the large number of APs in such a space, multiple APs are likely to receive a probe request message from a given wireless client device, and consequently, multiple probe response messages will be sent from the APs to a single wireless client device. As a result, a significant portion of the channel time will be used by probe response messages. This negatively affects overall throughput and efficiency of the wireless spectrum.

For example, in a closed arena, such as a sports or theater venue, in the seating of the lower bowl of the arena, it has been determined from measurements that over 50% of the traffic on a given channel consists of probe response messages sent by access points to client devices. For a single probe request message sent from a client device, it was found that 10-15 (or as many as 20) APs will respond to the request. Across the three channels in the 2.4 GHz band, that means 40 or more total probe responses could be sent. The probe response messages are sent at very low data rates, typically 1 Mbps. Consequently, numerous probe response messages collective occupy large amounts of channel time.

Figure 1A:
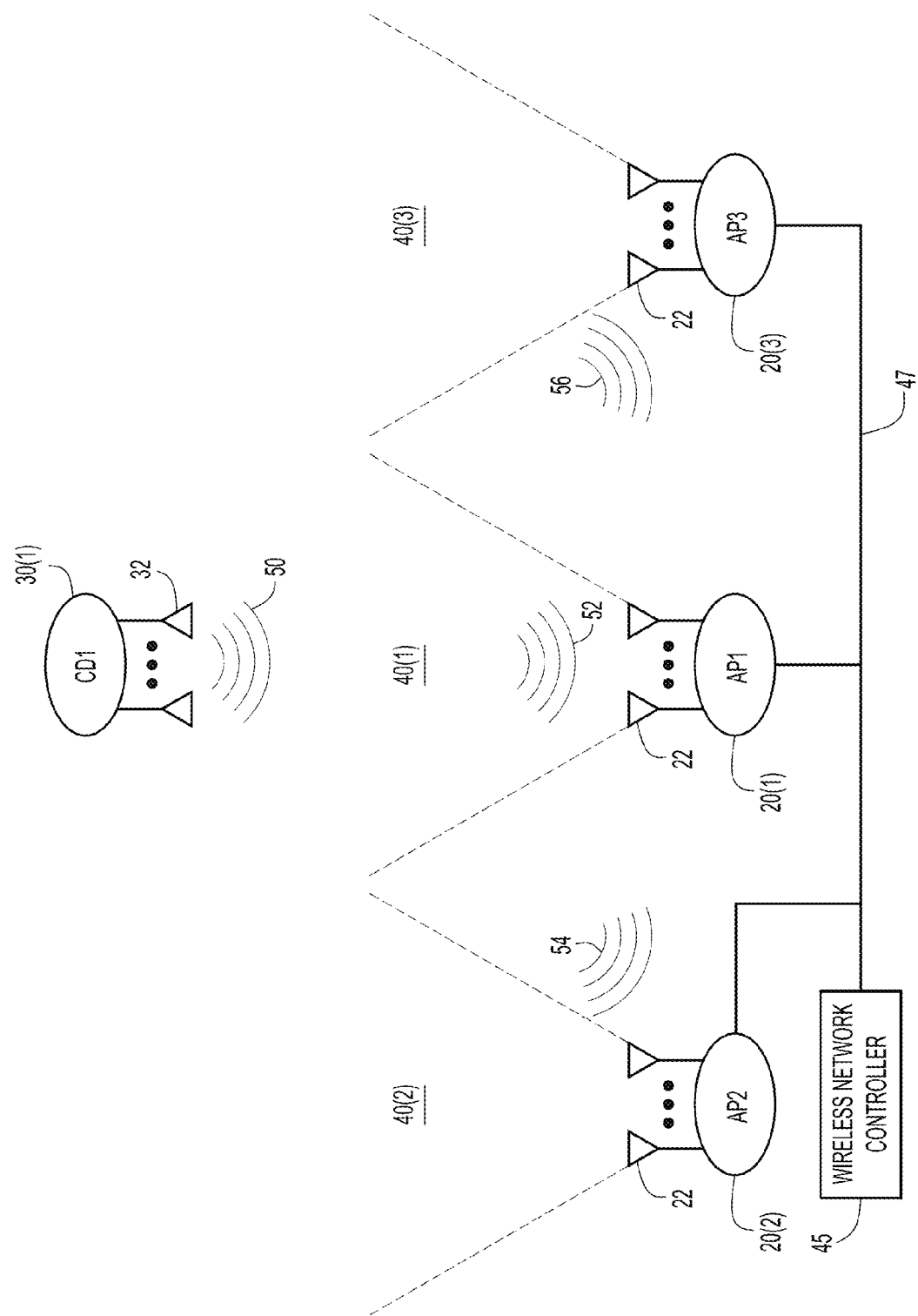

Reference is now made to FIGS. 1A and 1B, with initial reference to FIG. 1A. FIG. 1A shows an example in which there are three APs 20(1)-20(3) and one wireless client device (CD) 30(1). Each of the APs 20(1)-20(3) has a plurality of antennas, shown collectively at each AP at reference numeral 22. The wireless client device 30(1) has one or more antennas shown at reference numeral 32. This example shown in FIGS. 1A and 1B is simplified to illustrate the basic concepts of the techniques presented herein. In an actual wireless network deployment, there may be hundreds of APs and several hundreds or thousands of client devices.

Each of the APs 20(1)-20(3) can measure angle-of-arrival (AoA) with respect to a received message because the message will be received at each of a plurality of antennas of the respective AP. By computing relative phase values of the received message across its plurality of antennas, the AP can derive an AoA measurement for a received message from a given client device. Techniques for computing AoA are well known in the art and are therefore not included in this disclosure.

Based on the AoA measurement with respect to a message received from a client device, an AP can determine if the client is within the desired sector width. By setting an AoA threshold, an AP be configured to suppress probe responses to client devices that are too far outside its sector width determined/defined by its AoA threshold. FIG. 1A shows an example in which APs 20(1), 20(2) and 20(3) each are configured with a sector having a width, represented by reference numerals 40(1), 40(2), and 40(3), respectively. The width of each sector is defined by a corresponding angle-of-arrival threshold. A message received outside of the AoA threshold is said to be received outside of that sector.

Client device 30(1) sends a message 50, e.g., a probe request message in accordance with the IEEE 802.11 protocol. The APs 20(1)-20(3) will receive the message 50 with a different AoA due to their different locations relative to the client device 30(1). Reference numeral 52 shows that AP 20(1) receives the message with an AoA well within the sector 40(1). Reference numeral 54 shows that AP 20(2) receives the message with an AoA outside of the sector 40(2), and reference numeral 56 shows that AP 20(4) receives the message with an AoA outside of the sector 40(3). Thus, only AP 20(1), due to its relative location with respect to client device 30(1), receives message 50 with an AoA that is within an AoA threshold (corresponding to the sector 40(1)). Accordingly, in order to minimize the number of probe response messages that could be sent to client device 30(1), only AP 20(1) should send a probe response message to client device 30(1).

Reference is now made to FIG. 1B. FIG. 1B shows that since only AP 20(1) receives the message 50 with an AoA that was within the sector 40(1) for AP 20(1), only AP 20(1) transmits a probe response message, shown at reference numeral 60, to client device 30(1). Again, rather than all three APs 20(1), 20(2) and 20(3) possibly sending a probe response message to client device 30(1) as a result of receiving the probe request message 50, only one AP sends a probe response message, and therefore the wireless channel is burdened with only one probe request message. This is of course a simplification and in an actual wireless network deployment there are numerous more APs and client devices.

FIGS. 1A and 1B illustrate the basic scenario which is particularly common in a high density deployment where it is desirable to have only a particular AP respond to a probe request. The locations of the APs in a deployment are generally known. However, configurations need to be made to the APs so that only the AP that is "assigned" or dedicated to a particular sector at a particular location in a deployment responds to a client's probe request. The decision of whether to respond to a probe request can be made at the APs themselves, or at a wireless network controller 45 that is in communication with the APs by way of a wired local area network (LAN) 47. In the latter scenario, each AP could send its AoA information for a received probe request message back to the wireless network controller 45, and the wireless network controller 45 would compare the AoA for the received message at each AP with a corresponding AoA threshold to determine which AP should respond to the probe request. The wireless network controller 45 would then send a command to the particular AP that should send the probe response, and not to the other APs, or could send an appropriate command to each of the APs, notifying each AP whether or not it should respond to the probe request. It should be understood that there may be situations when it is desirable for more than one AP to respond to a probe request to ensure a client device establishes connectivity into the wireless network.

Figure 2:
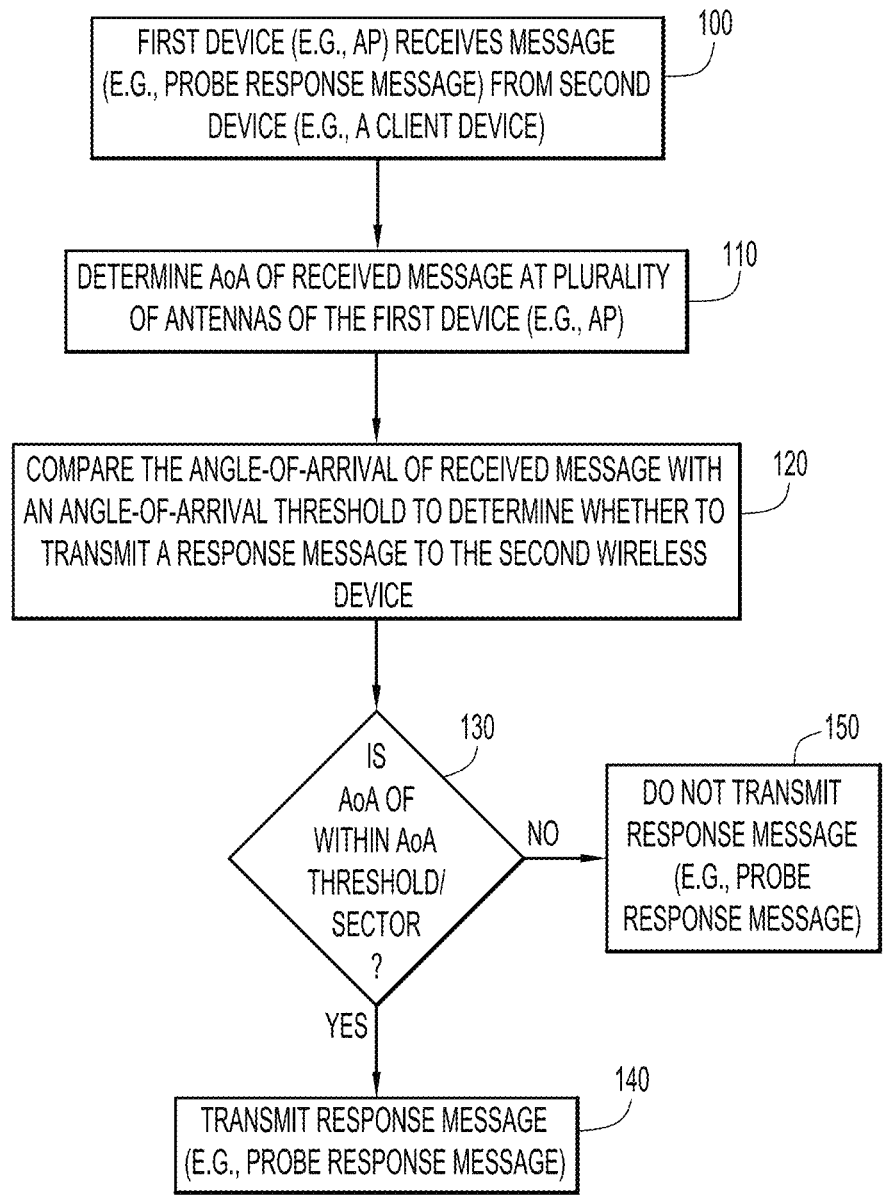
FIG. 2 is a flow chart depicting operations performed by a wireless access point device according to the angle-of-arrival threshold-based probe response techniques presented herein.

Reference is now made to FIG. 2 for description of a flow chart of the operations performed in a first wireless device (e.g., AP) according to the techniques described herein. It is also possible that some of the operations depicted in FIG. 2 are performed in a device other than the AP, such as the wireless network controller 45. At 100, the first device (e.g., AP) receives a message e.g., a probe request message, from a second device (e.g., client device). At 110, the first device determines an AoA of the message received at a plurality of antennas of the first device. At 120, the AoA of the received message is compared with an AoA threshold to determine whether the first device (e.g., AP) should transmit a response message to the second device (e.g., client device). At 130, it is determined whether the AoA of the received message is within the AoA threshold. If so, then at 140 the first device transmits a response message, e.g., probe response message, to the second device. If not, then at 150, the first device does not transmit a response message to the second device. As explained above, operations 120 and 130 may be performed at the wireless network controller 45 (FIGS. 1A and 1B) based on AoA information received from the APs.

Figure 3:
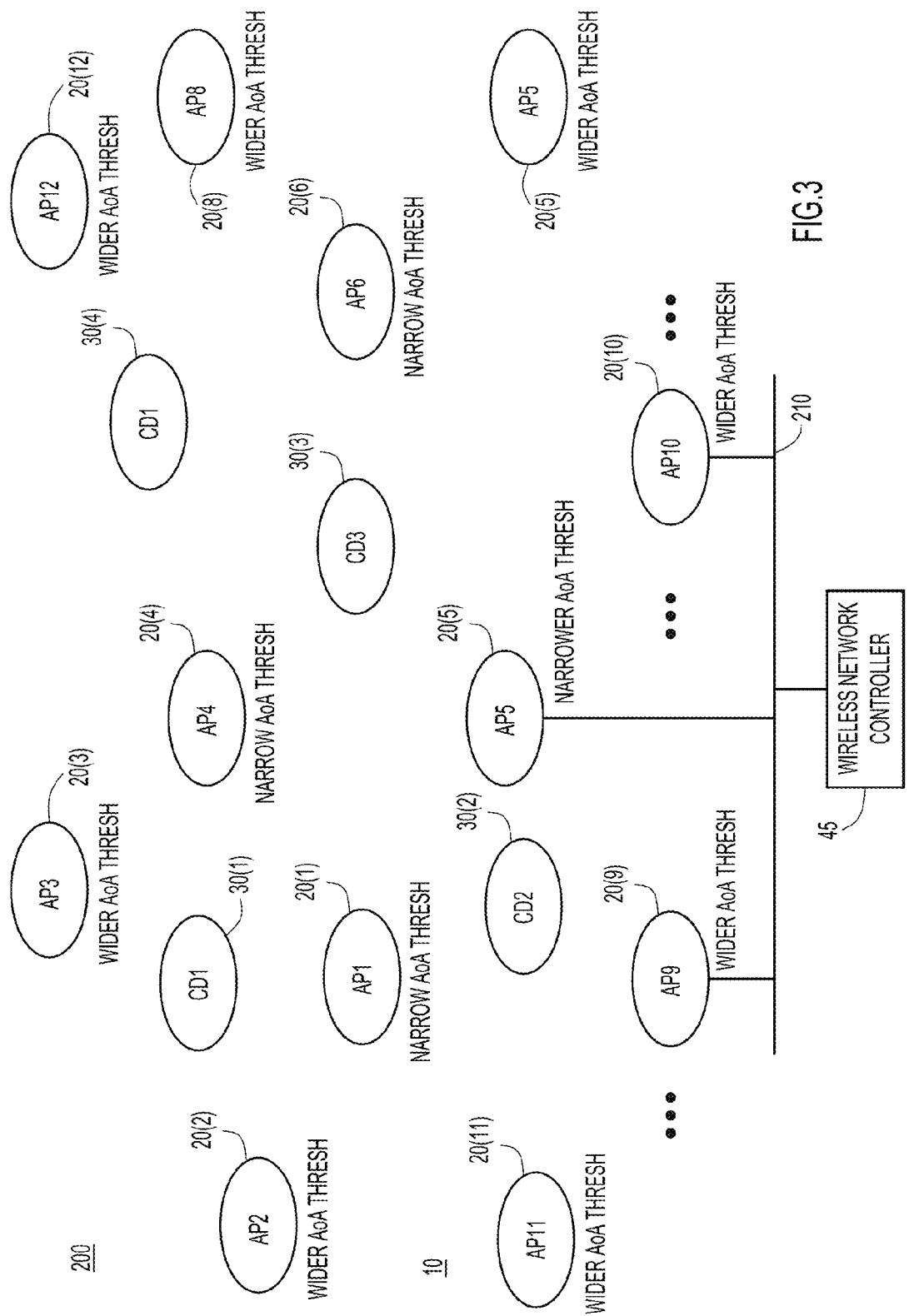
FIG. 3 is a block diagram of a wireless network showing a plurality of wireless access point devices configured with different angle-of-arrival thresholds according to the techniques presented herein.

The AoA threshold for a given AP may be adjusted/tuned, thereby increasing or decreasing the width of the sector of the AP (e.g., see sectors 40(1)-40(3) in FIGS. 1A and 1B) for which the AP will respond to probe request messages. This adjustment may be based on a command that the AP receives from the wireless network controller 45. To this end, reference is now made to FIG. 3. FIG. 3 shows a wireless network 200 comprising a plurality of APs 20(1)-20(12), shown at different physical locations in a wireless network deployment. As an example, these APs may be positioned at different positions in a high density deployment, such as within an indoor arena or an outdoor arena. There is also a plurality of client devices 30(1)-30(5) in this example.

Some of the APs are positioned on an edge or periphery of the deployment and others are positioned more towards an inner portion of the deployment. Examples of edge APs are APs 20(2), 20(3), 20(11), 20(12), 20(7) and 20(8) and examples of inner APs are APs 20(1), 20(4), 20(5) and 20(6). Each of the APs is in communication, e.g., by local area network (LAN) 210, to wireless network controller 45. The wireless network controller 45 may be a physical device, e.g., a server blade with network connectivity, or a software application hosted in a cloud computing/data center facility.

The AoA threshold can be tuned on a per-AP basis or per group of APs basis to allow for different AoA threshold settings across APs. For example, an edge AP may have a different AoA threshold than an inner AP. As shown in FIG. 3, the inner APs 20(1), 20(4), 20(5) and 20(6) may have relatively narrow AoA thresholds/sectors whereas outer APs 20(2), 20(3) and 20(7)-20(12) may have relatively wider AoA thresholds/sectors.

In high density networks, certain locations tend to experience similar radio frequency (RF) conditions as well as load conditions. APs that have similar RF and load characteristics may be grouped together into what are called "RF Profile Groups" and APs within the same group are given similar configurations. The APs within an RF profile group are at different locations, but nevertheless, experience similar wireless network conditions. Thus, according to the techniques presented herein, APs within the same group may be given a similar AoA threshold. It is easier for a network administrator to configure a group of APs with a particular AoA threshold as opposed to configuring each individual AP with a particular AoA threshold. For example, APs 20(2), 20(3) and 20(7)-20(12) may all be given a similar AoA threshold, but again, each is at a different location, and in so doing, the number of probe responses sent to a given client device is minimized.

APs could be automatically grouped, for purposes of setting their AoA threshold/sector width, based on a site survey done by the wireless network controller 45. To this end, data indicating how many probe responses a client receives and from which APs, is sent from a client device to an AP, and the AP forwards that data to the wireless network controller 45. If a client receives a probe response from multiple APs, that means those APs have overlapping sectors and the wireless network controller 45 may adjust the sectors (by adjusting the AoA threshold) of one or more APs so that only one of those APs responds to the client. This may be done in real-time or the wireless network controller 45 may be configured to analyze data collected for clients for activity in the network over time to determine whether to adjust the sector of one or more APs In addition, in some wireless networks, APs transmit signals to each other for purposes of radio resource management, etc. These signals may be used by the APs in order to determine appropriate AoA thresholds the APs should use. In this scenario, the wireless network controller 45 need not be involved. The APs may do this autonomously.

Furthermore, the AoA threshold for one or more APs could also be tuned dynamically based on overlap of AP coverage area or sectors, as well as based on traffic load of the APs. The wireless network controller 45 may configure an AP that has a greater traffic load to narrow its AoA threshold/sector width in order to reduce the number of probe responses that it may send based on received probe request messages. This may be done on an automatic and ongoing basis so as to prevent the traffic load on APs from exceeding a predetermined threshold. By reducing the sector size and consequently reducing the amount of probe responses transmitted to clients, a particular AP will be more likely to attract fewer client associations and serve less traffic, thereby reducing the load on the AP.

Figure 4:
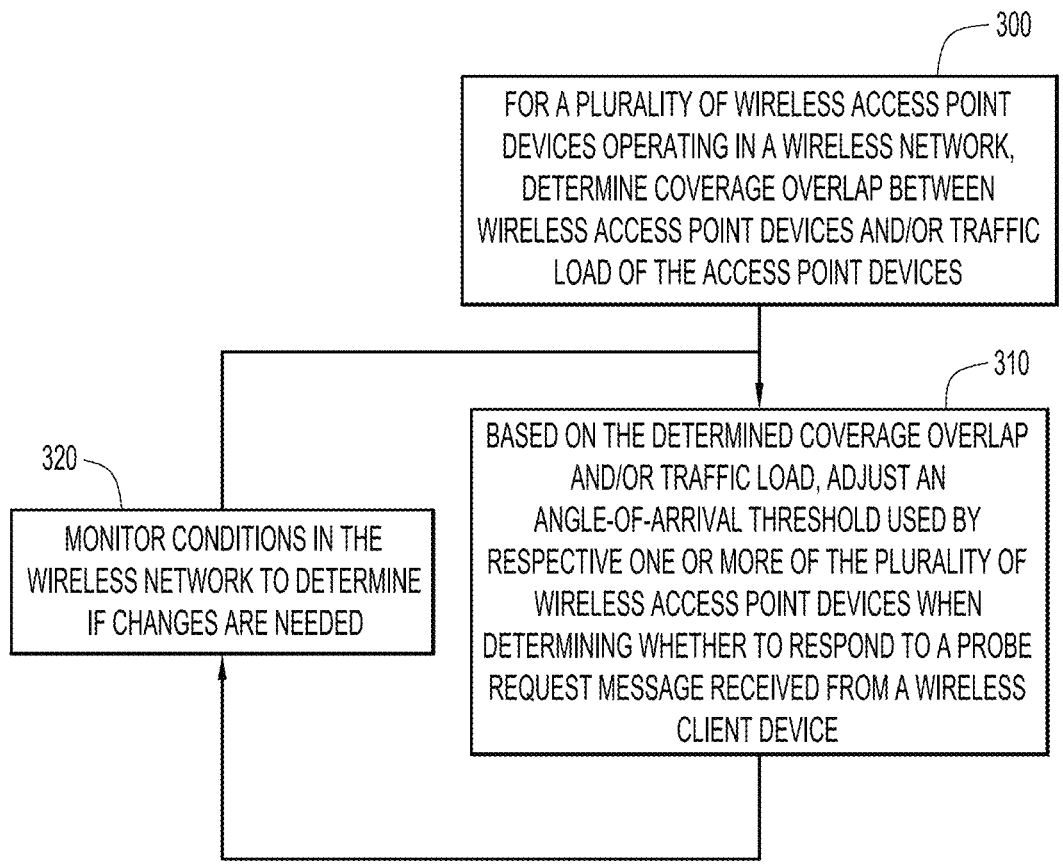
FIG. 4 is a flow chart depicting operations to adjust angle-of-arrival thresholds for multiple wireless access point devices.

Reference is now made to FIG. 4, for description of a flow chart of control level operations. These operations may be performed at the wireless network controller 45 shown in FIG. 3, for example. At 300, for a plurality of APs operating in a wireless network, coverage overlap between APs is determined. As described above, the coverage area overlap (e.g., overlap of sectors of APs) may be determined based on reports received from client devices as to the number of probe responses a client device receives, and from which APs the client device receives those probe responses. At 310, based on the determined coverage overlap and/or traffic load, an AoA threshold, used by respective one or more of the plurality of APs when determining whether to respond to a probe request message received from a wireless client device, is adjusted. At 310, the wireless network controller 45 may send a command to one or more APs to adjust the AoA threshold of the one or more APs. In addition, at 320, the wireless network controller 45 monitors conditions in the wireless network to determine if changes are needed to the AoA threshold of one or more APs, e.g., based on observed sector overlap and/or traffic load of APs.

Figure 5:
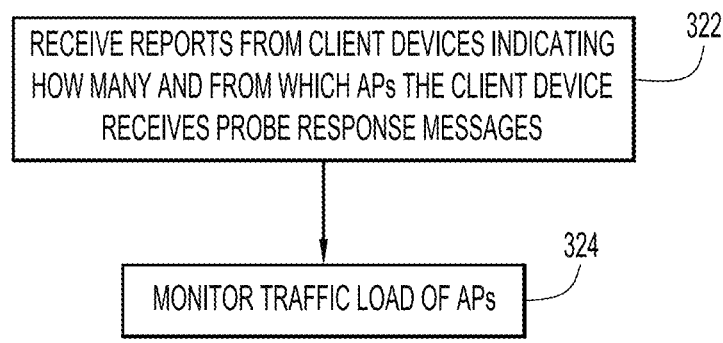
FIG. 5 is an example block diagram of a wireless access point device configured to use an angle-of-arrival threshold in determining whether to respond to a probe request message.

Turning to FIG. 5, further details are shown for the monitoring operation 320. At 322, the wireless network controller receives reports from client devices indicating how many APs, and from which APs, the client device receives probe response messages. In addition, at 324, the wireless network controller monitors traffic load of each of the APs it controls. The outputs of operations 322 and 324 are fed to operation 310 in FIG. 4 for purposes of determining whether and how to adjust an AoA threshold/sector width of one or more APs.

Figure 6:
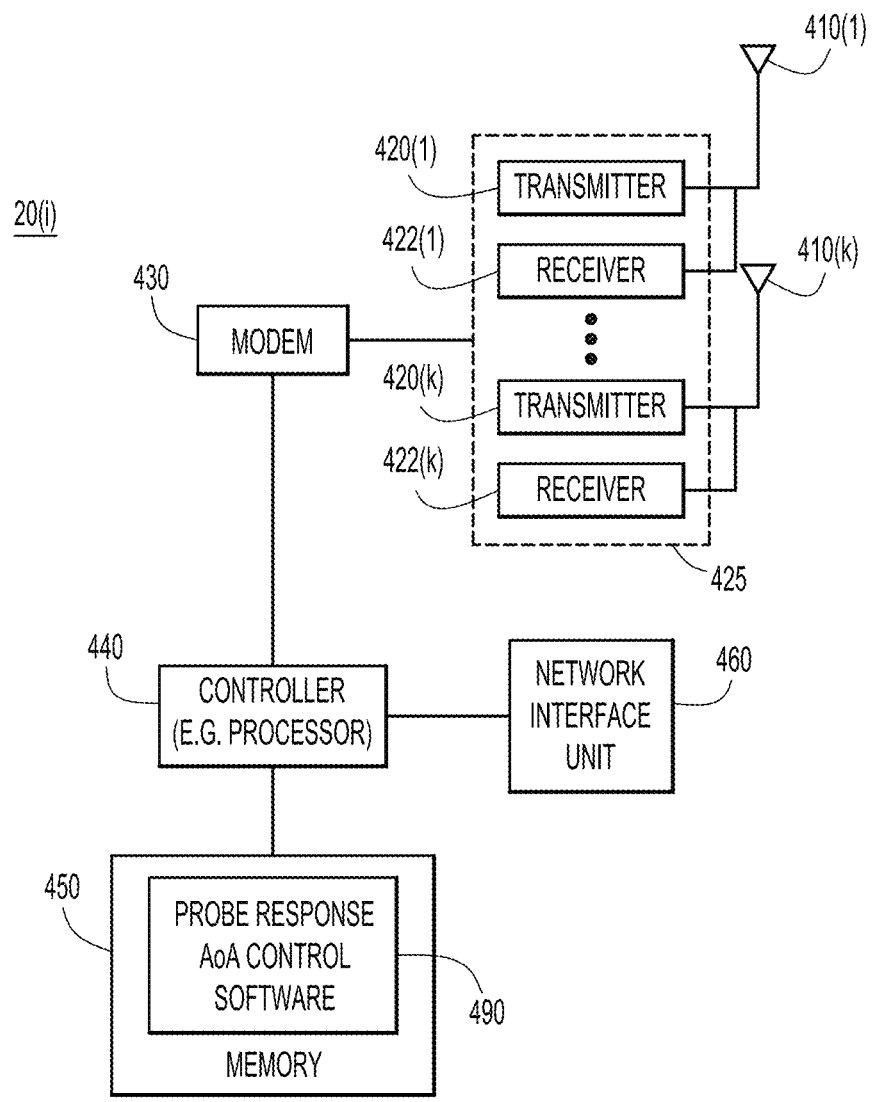
FIG. 6 is an example block diagram of a wireless network controller configured to manage the angle-of-arrival threshold used by multiple wireless access point devices in a wireless network deployment, such as that shown in FIG. 3.

Referring now to FIG. 6, a block diagram is shown of an AP configured to perform the techniques described herein. The diagram in FIG. 6 is meant to be representative of any of the APs referred to herein. For simplicity, the AP shown in FIG. 6 is generically identified by reference numeral 20(*i*).

The AP 20(*i*) comprises a plurality of antennas, 410(1)-410(*k*), and a corresponding plurality of transmitters 420(1)-420(*k*) and receivers 422(1)-422(*k*), each coupled to a corresponding one of the plurality of antennas 410(1)-410(*k*). The plurality of transmitters 420(1)-420(*k*) and receivers 422(1)-422(*k*) may be part of an integrated radio transceiver 425. A baseband processing unit or modem 430 is coupled to the radio transceiver 425, and performs baseband signal processing, such as baseband modulation of transmit signals and baseband demodulation of receive signals.

A control unit (controller) 440 is coupled to the baseband processing unit 430. The control unit 440 performs high level control of the AP. The control unit 440 may comprise a microprocessor or microcontroller that executes software instructions stored in memory 450. The AP includes a network interface unit 460, e.g., a network interface card, to enable wired network communications on behalf of the AP.

The memory 450 stores instructions for probe response AoA control software 490 that, when executed by the controller 440, cause the controller unit 440 to perform the operations described herein to allow an AP to adjust an AoA threshold/sector width for purposes of determining whether or not to respond to a probe request message from a client device.

The baseband processing unit 430 may be implemented by digital logic gates in one or more application specific integrated circuits, or may be implemented by software executed by the control unit 440.

The memory 450 may comprise read only memory (ROM), random access memory (RAM), magnetic disk storage media devices, optical storage media devices, flash memory devices, electrical, optical, or other physical/tangible memory storage devices. Thus, in general, the memory 450 may comprise one or more tangible (non-transitory) computer readable storage media (e.g., a memory device) encoded with software comprising computer executable instructions and when the software is executed (by the control unit 440) it is operable to perform the operations described herein. As part of the operations performed when executing the software 490, the control unit 440 may process and respond to a command received from a wireless network controller to adjust an AoA threshold/sector width for purposes of determining whether the AP is to respond to a probe request message as depicted in FIGS. 1A, 1B and 2.

Figure 7:
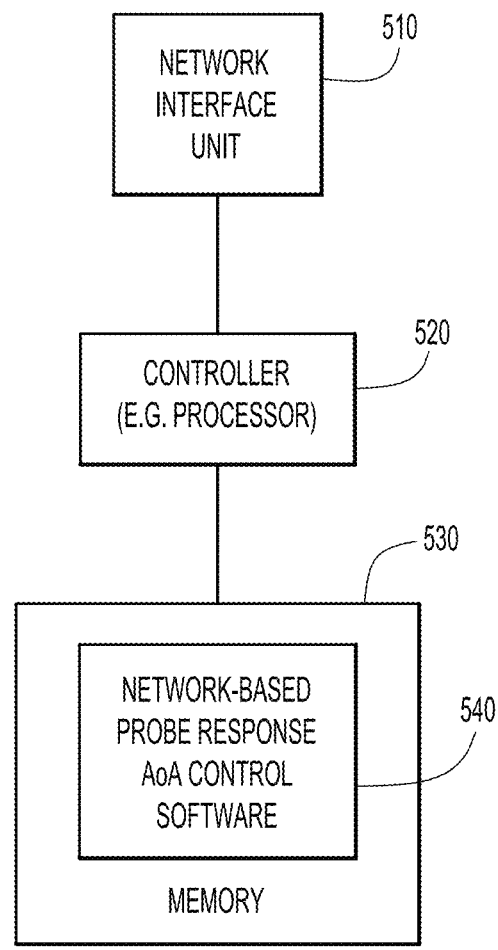
FIG. 7 is a block diagram of a wireless network controller, according to an example embodiment.

Turning now to FIG. 7, an example block diagram is shown for wireless network controller 45. As described above, the wireless network controller 45 may take the form of a server computer or server blade, or may be embodied by one or more virtual machines running in a data center computing environment. The wireless network controller 45 includes a network interface unit 510 to enable wired (or wireless) network communications with APs in a wireless network, a processor (or multiple processors) 520 and memory 530. The memory 530 stores network-based probe response AoA control software 540 that, when executed by processor 520, causes the processor 520, in cooperation with the network interface unit 510, to perform the wireless network controller operations described herein for setting and adjusting the AoA threshold of one or more APs in a wireless network as depicted in FIGS. 3-5.

To summarize, the techniques presented herein solve the problem of having too many APs responding to probe requests in a wireless network. It has been determined by observing the behavior of certain wireless network deployments that as much as 50% of traffic in a wireless network is due to probe responses. Accordingly, AoA of a received probe request message is used to filter out which APs respond to the probe request message from a given client device. If the AoA of the received probe request message is outside of the sector width as determined by the AoA threshold for an AP, then the AP does not transmit a probe response message to the received probe request message. It has been determined that AoA based probe response filtering can do a much better job in limiting the number of APs that respond to a probe request message. Limiting the probe responses to nearby APs also means that a client device will tend to choose a "better" AP (i.e. closer or for which a better link quality can be achieved). As a result, the techniques presented herein can limit the number of low data rate clients which are mistakenly associated to a "distant" AP.

While the foregoing description uses the terms "APs" and "clients", it is to be understood that these techniques are not limited to use in IEEE 802.11 wireless local area networks. Thus, the term first wireless device is intended to broadly refer to APs and other wireless access devices that serve wireless devices any type of wireless network (local or wide area). Likewise, the term second wireless device is meant to broadly refer to wireless client devices, mobile stations, user equipment, etc.

In summary, a method is provided comprising receiving a message at a first wireless device from a second wireless device; determining an angle-of-arrival of the message at a plurality of antennas of the first wireless device; and comparing the angle-of-arrival with an angle-of-arrival threshold to determine whether to transmit a response message to the second wireless device.

Similarly, an apparatus is provided comprising a plurality of antennas; a receiver unit configured to detect signals received at the plurality of antennas; a transmitter configured to transmit a signal via one or more of the plurality of antennas; a modem configured to modulate signals for transmission and to demodulate signals obtained by the receiver unit; and a control unit coupled to the modem and the receiver unit, the control unit configured to: determine an angle-of-arrival of a message received at the plurality of antennas from a wireless device; compare the angle-of-arrival with angle-of-arrival threshold to determine whether to transmit a response message to the wireless device.

Further still, a method is provided comprising: for a plurality of wireless access point devices operating in a wireless network, determining coverage overlap between wireless access point devices; and based on the determined coverage overlap, adjusting an angle-of-arrival threshold used by respective one or more of the plurality of wireless access point devices when determining whether to respond to a probe request message received from a wireless client device.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   receiving a message at a first wireless device from a second wireless device;
   determining an angle-of-arrival of the message at a plurality of antennas of the first wireless device;
   comparing the angle-of-arrival with an angle-of-arrival threshold;
   determining, based on a result of the comparing of the angle-of-arrival with an angle-of-arrival threshold, whether to transmit a response message to the second wireless device; and
   transmitting the response message if the angle-of-arrival is less than the angle-of-arrival threshold.

2. The method of claim 1, further comprising not transmitting the response message if the angle-of-arrival is not within the angle-of-arrival threshold.

3. The method of claim 1, wherein the first wireless device is a first wireless access point device operating in a wireless network, the second wireless device is a wireless client device operating in the wireless network, the message is a probe request message and the response message is a probe response message.

4. The method of claim 3, further comprising adjusting the angle-of-arrival threshold.

5. The method of claim 4, further comprising receiving a command from a wireless network controller, and wherein adjusting is based on the command.

6. The method of claim 5, further comprising determining whether to adjust the angle-of-arrival threshold of the first wireless access point device based on coverage overlap between the first wireless access point device and one or more other wireless access point devices operating in the wireless network.

7. The method of claim 5, further comprising determining whether to adjust the angle-of-arrival threshold of the first wireless access point device based on traffic load of the first wireless access point device.

8. The method of claim 5, further comprising, at the wireless network controller that is in communication with a plurality of wireless access point devices operating in the wireless network, including the first wireless access point device, adjusting an angle-of-arrival threshold to be used by a group of two or more of the plurality of wireless access point devices.

9. The method of claim 8, wherein adjusting comprises dynamically adjusting the angle-of-arrival threshold to be used by the group of two or more of the plurality of wireless access point devices based on conditions in the wireless network.

10. The method of claim 4, wherein adjusting is based on signals received by the first wireless access point device from one or more other wireless access point devices operating in the wireless network from which an overlap of coverage of the first wireless access point device can be determined with respect to one or more other wireless access point devices.

11. An apparatus comprising:
    a plurality of antennas;
    a receiver unit configured to detect signals received at the plurality of antennas;
    a transmitter configured to transmit a signal via one or more of the plurality of antennas;
    a modem configured to modulate signals for transmission and to demodulate signals obtained by the receiver unit; and
    a control unit coupled to the modem and the receiver unit, the control unit configured to:
       determine an angle-of-arrival of a message received at the plurality of antennas from a wireless device;
       compare the angle-of-arrival with angle-of-arrival threshold;
       determine, based on a result of the comparison of the angle-of-arrival with an angle-of-arrival threshold, whether to transmit a response message to the wireless device; and
       cause the response message to be transmitted to the wireless device if the angle-of-arrival is within the angle-of-arrival threshold, and to cause the response message not to be transmitted if the angle-of-arrival is not within the angle-of-arrival threshold.

12. The apparatus of claim 11, wherein the message is a probe request message sent by the wireless device that is a wireless client device operating in a wireless network and the control unit is configured to generate a probe response message to be transmitted to the wireless client device if the angle-of-arrival of the probe request message is within angle-of-arrival threshold.

13. The apparatus of claim 12, wherein the control unit is configured to adjust the angle-of-arrival threshold.

14. The apparatus of claim 13, wherein the control unit is configured to adjust the angle-of-arrival threshold based on a command received from a wireless network controller.

15. The apparatus of claim 13, wherein the control unit is configured to adjust the angle-of-arrival threshold based on coverage overlap between the two or more of the plurality of wireless access point devices.

16. The apparatus of claim 13, wherein the control unit is configured to dynamically adjust the angle-of-arrival threshold based used by the group of two or more of the plurality of wireless access point devices based on conditions in the wireless network.

17. A method comprising:
- for a plurality of wireless access point devices operating in a wireless network, determining coverage overlap between wireless access point devices; and
- based on the determined coverage overlap, adjusting an angle-of-arrival threshold used by respective one or more of the plurality of wireless access point devices when determining whether to respond to a probe request message received from a wireless client device.

18. The method of claim 17, wherein adjusting is based on coverage overlap determined between wireless access point devices.

19. The method of claim 18, wherein adjusting comprises dynamically adjusting the angle-of-arrival threshold to be used by the group of two or more of the plurality of wireless access point devices based on conditions in the wireless network.

20. The method of claim 18, wherein adjusting comprises adjusting the angle-of-arrival threshold to be used by a group of two or more of the plurality of wireless access point devices.

21. The method of claim 17, wherein adjusting is based on traffic load of the wireless access point devices.

* * * * *